May 21, 1940.    E. E. KELLEY    2,201,182
MACHINE TOOL
Filed Aug. 23, 1939    4 Sheets-Sheet 1

INVENTOR
Elmer E. Kelley
BY
ATTORNEY

May 21, 1940. E. E. KELLEY 2,201,182
MACHINE TOOL
Filed Aug. 23, 1939 4 Sheets-Sheet 2

INVENTOR
Elmer E. Kelley
By
ATTORNEY

May 21, 1940.  E. E. KELLEY  2,201,182
MACHINE TOOL
Filed Aug. 23, 1939   4 Sheets-Sheet 3
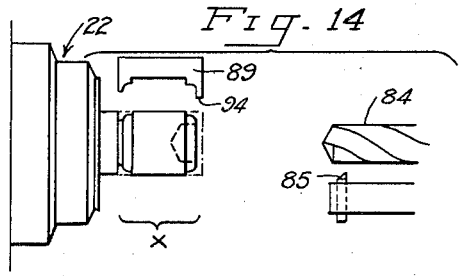
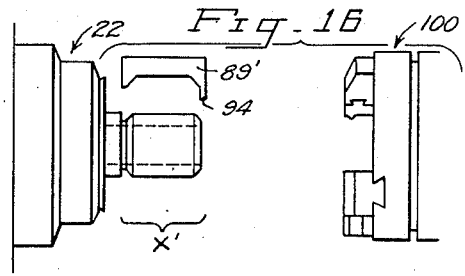
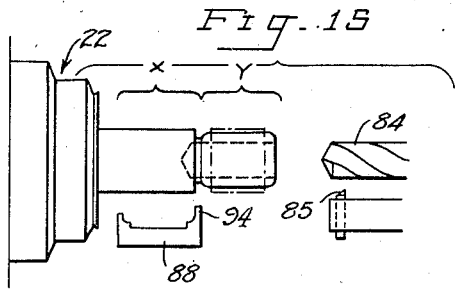
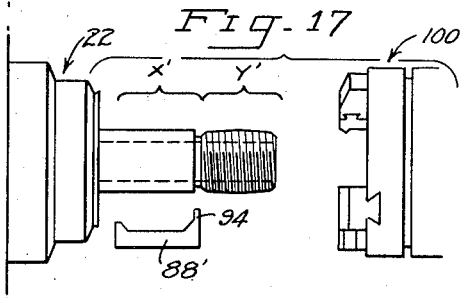
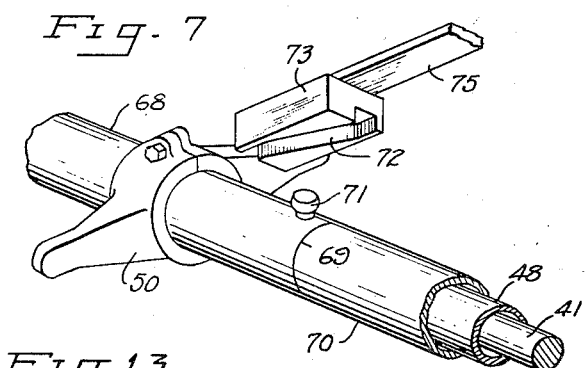
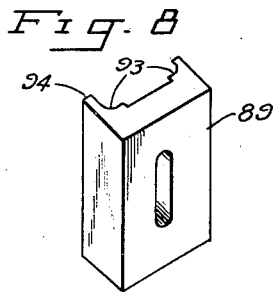
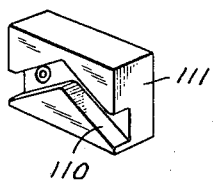
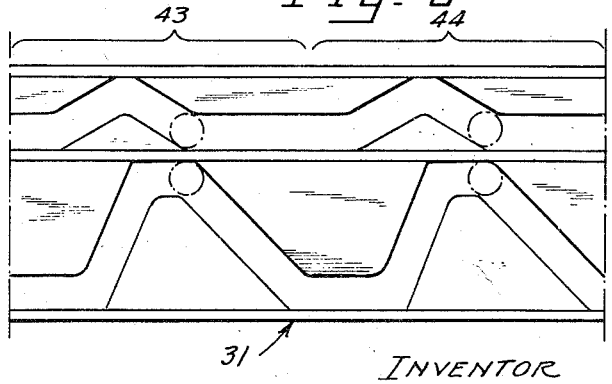
INVENTOR
Elmer E. Kelley
BY
ATTORNEY May 21, 1940.　　　　　E. E. KELLEY　　　　　2,201,182
MACHINE TOOL
Filed Aug. 23, 1938　　　　4 Sheets-Sheet 4
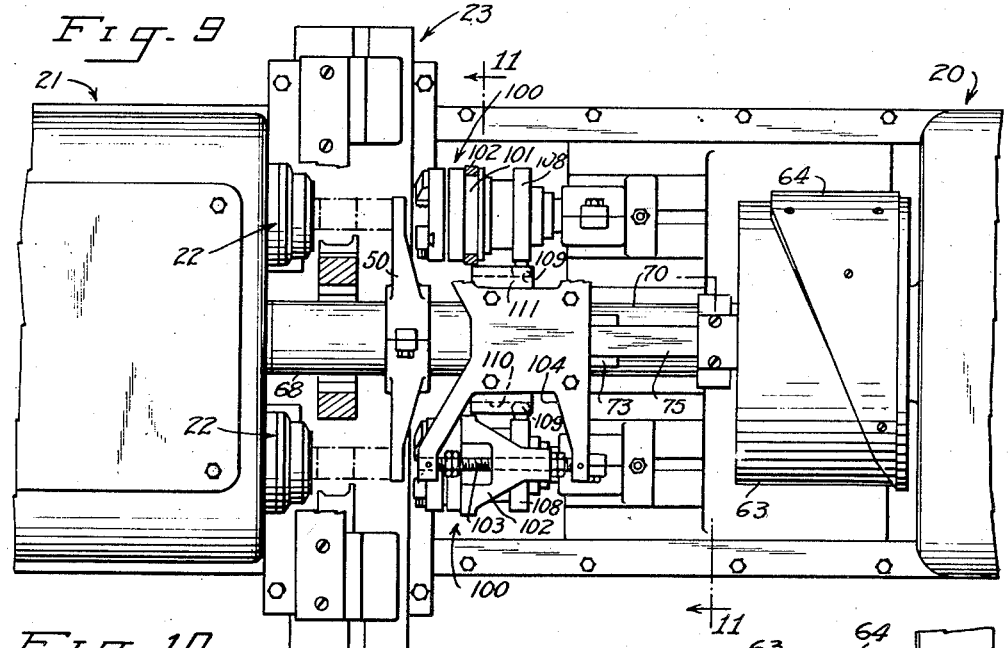
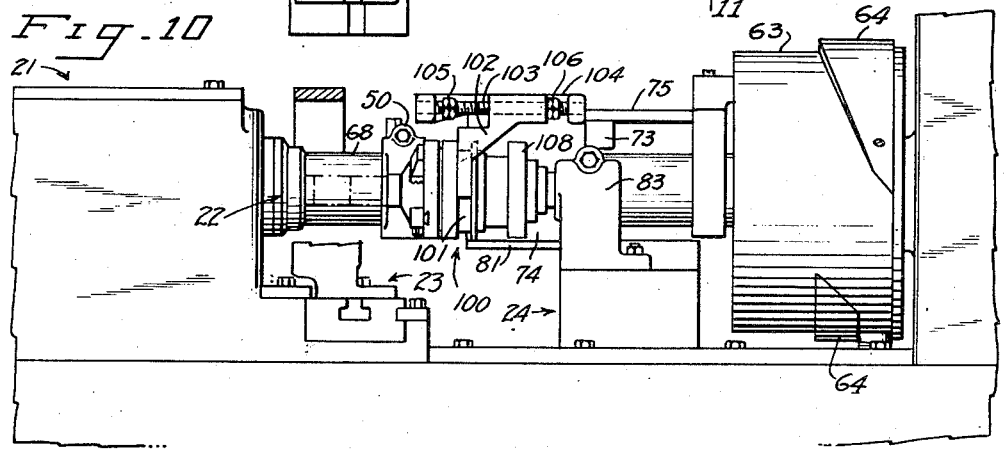
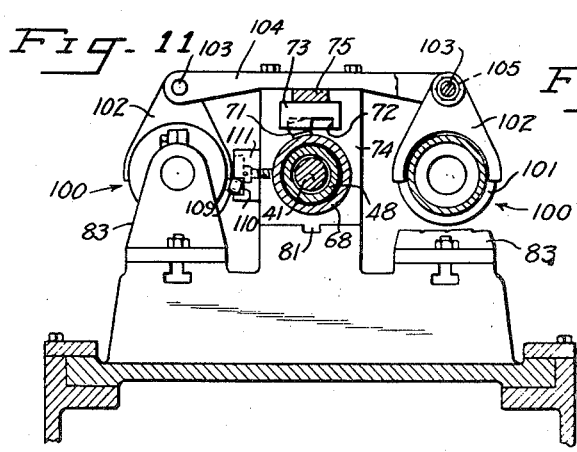
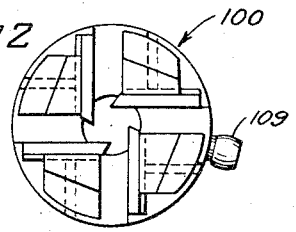
INVENTOR
Elmer E. Kelley
By
ATTORNEY Patented May 21, 1940

2,201,182

UNITED STATES PATENT OFFICE 2,201,182

MACHINE TOOL

Elmer E. Kelley, Windsor, Vt.

Application August 23, 1938, Serial No. 226,289

42 Claims. (Cl. 29—53)

This invention relates to metal working machines of the kind generally known as automatic screw machines.

Among the general objects of the invention are to provide an improved machine of this character, particularly adapted for forming turned metal articles at a higher rate of production than heretofore attainable, and capable of accomplishing like operations, or a number of different operations, simultaneously on each work piece; and to provide an improved multiple spindle machine capable of producing a completed article on each work spindle for every cycle of operation thereof in an improved manner.

A further object of my invention is to provide an improved machine of the type comprising two or more work rotating spindles, each including means for gripping the work during the tool operation and means for feeding the work stock forward to advance a new work piece into the tool region, the machine also including a stop element cooperating with the work feeding means to determine the length of stock to be fed; it being a further object to provide improved means for actuating this stop element between effective and ineffective positions.

Another object is to provide an improved automatic machine in which the tools moving transversely of the work spindles, such as forming and/or cutting-off tools, are supported on and presented to the work by a common carrier or tool slide; and in which the arrangement of the transversely operable tools is so improved that the respective tools of any work spindle may operate alternately on the work to thereby assure a longer tool life, such arrangement having a further inherent advantage of permitting a relatively slow speed for the tools notwithstanding the high speed operation of the machine.

A further object is to provide such an improved machine having accommodation for other tools operating axially or endwise on the work, such, for example, as boring, threading or finishing tools, the tool or tools of the respective spindles being operable simultaneously in an improved manner and supported and presented to the work on a common carrier in an improved manner, and actuated in harmony with the transverse tool carrier, so as to accomplish all operations on the work piece in an improved manner substantially at the same time, and thus produce finished articles usually requiring a series of successive operations, in an appreciably shorter time.

The invention has for a further object, the provision of an improved machine adapted for the operation of the well known self-opening threading die, the machine affording improved automatic feeding of the die to the work, as well as improved means whereby the die may be automatically manipulated to open or close the same at the desired time intervals. A further object of the invention is to provide an improved machine for the operation of improved dies having chasers controlled in a manner to cut tapering threads as for pipe joints, or to cut oppositely tapering threads in one operation as for pipe nipples; in either instance the machine affording complete and automatic actuation of the controlling elements of the die. Still further objects of my invention are to provide improved actuating mechanism and improved controlling mechanism for the several mechanisms of the machine whereby these latter mechanisms are enabled to cooperate in an improved and effective manner.

These and other objects and advantages will hereinafter more fully appear.

In the accompanying drawings, I have shown for purposes of illustration, two embodiments which my invention may assume in practice.

In these drawings:

Fig. 4 is a transverse sectional view taken on line 4—4 of Figure 2 and illustrating the transverse tool slide;

Fig. 5 is a transverse sectional view taken on line 5—5 of Figure 2 and showing the longitudinal tool carrier;

Fig. 6 is a developed plan view of the cam drum for actuating the work gripping and feeding means of the spindles;

Fig. 7 is a fragmentary perspective view showing portions of the mechanism for operating the stock stop arm, the slide block being turned upward to facilitate illustration;

Fig. 8 is a perspective view of the improved combination tool;

Fig. 9 is a fragmentary plan view illustrating a modified form of the invention, the embodiment herein being adapted for the application of self opening threading dies to the work;

Fig. 10 is a fragmentary side elevational view of the machine shown in Figure 9;

Fig. 11 is a transverse sectional view taken on the staggered line 11—11 of Figure 9;

Fig. 12 is an elevation of the chaser end of the threading die;

Fig. 13 is a detail perspective view of the controlling cam for the threading die;

Figure 1:
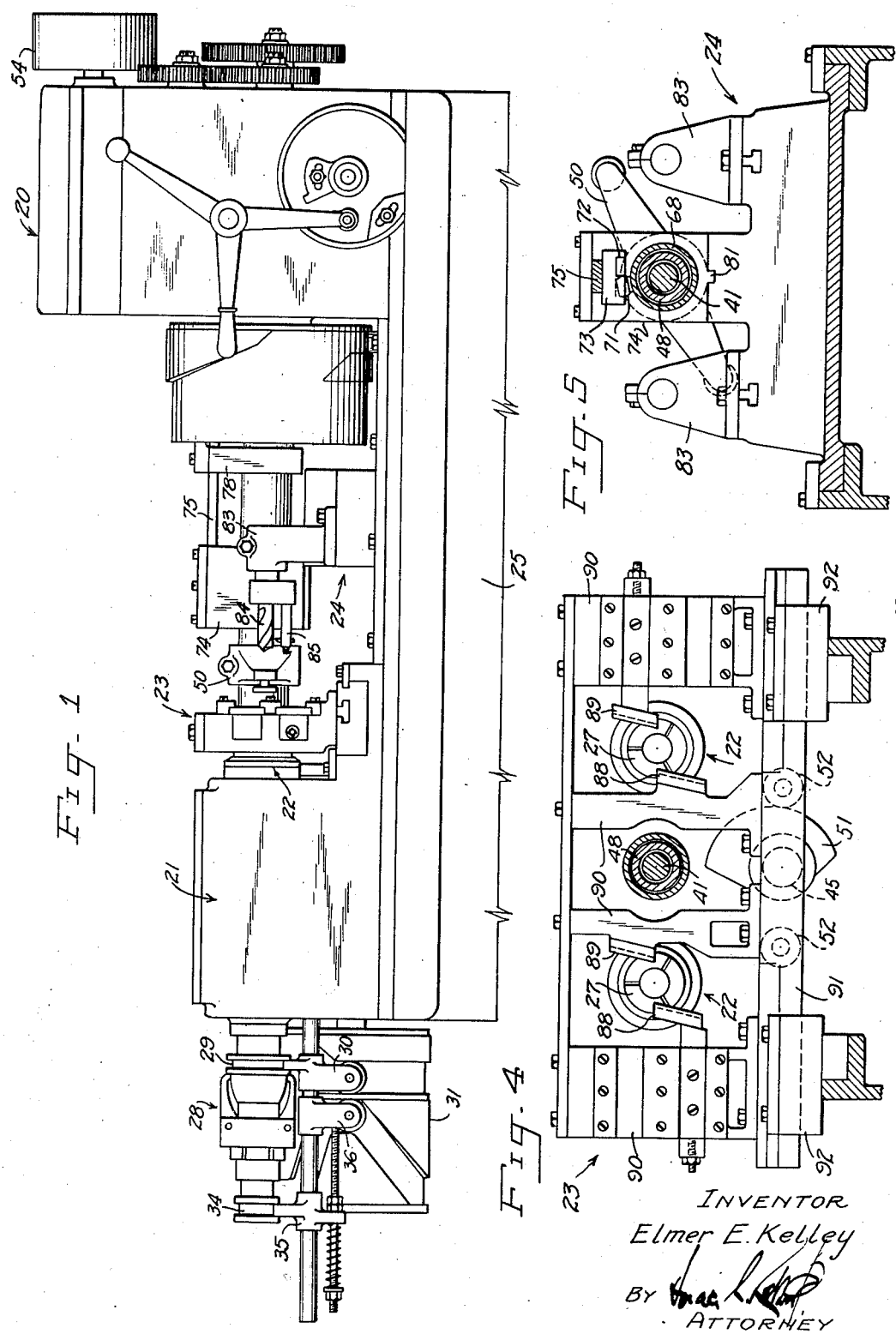
Figure 1 is a side elevational view of the machine embodying one form of the invention, portions of the machine base being broken away.

Figs. 14 and 15 are diagrammatic plan views illustrating, respectively, successive stages of operation of the tools on the work of a single spindle in accordance with the embodiment of the invention shown in Figures 1 to 8, and Figs. 16 and 17 are views similar, respectively, to Figures 14 and 15, but illustrating the successive stages of operation on the form of the machine shown in Figures 9 to 13.

Each embodiment of the invention illustrated herein may assume the general arrangement shown and described in my prior Patent No. 1,892,239, issued December 27, 1932, to which reference is had for certain of the mechanism employed in the organization of the present invention.

Referring first to the illustrative construction shown in Figures 1 to 8, inclusive, the machine comprises generally a main drive unit or gear box 20 and a head stock 21, on which is mounted a plurality, herein a pair, of work rotating and feeding spindles 22; the work carried by these spindles being operated upon by tools supported in a transversely movable tool slide 23, and by other tools carried on a longitudinally movable tool carrier 24, the mentioned units being all supported on a base 25 in operative association with each other.

Figures 2, 3:
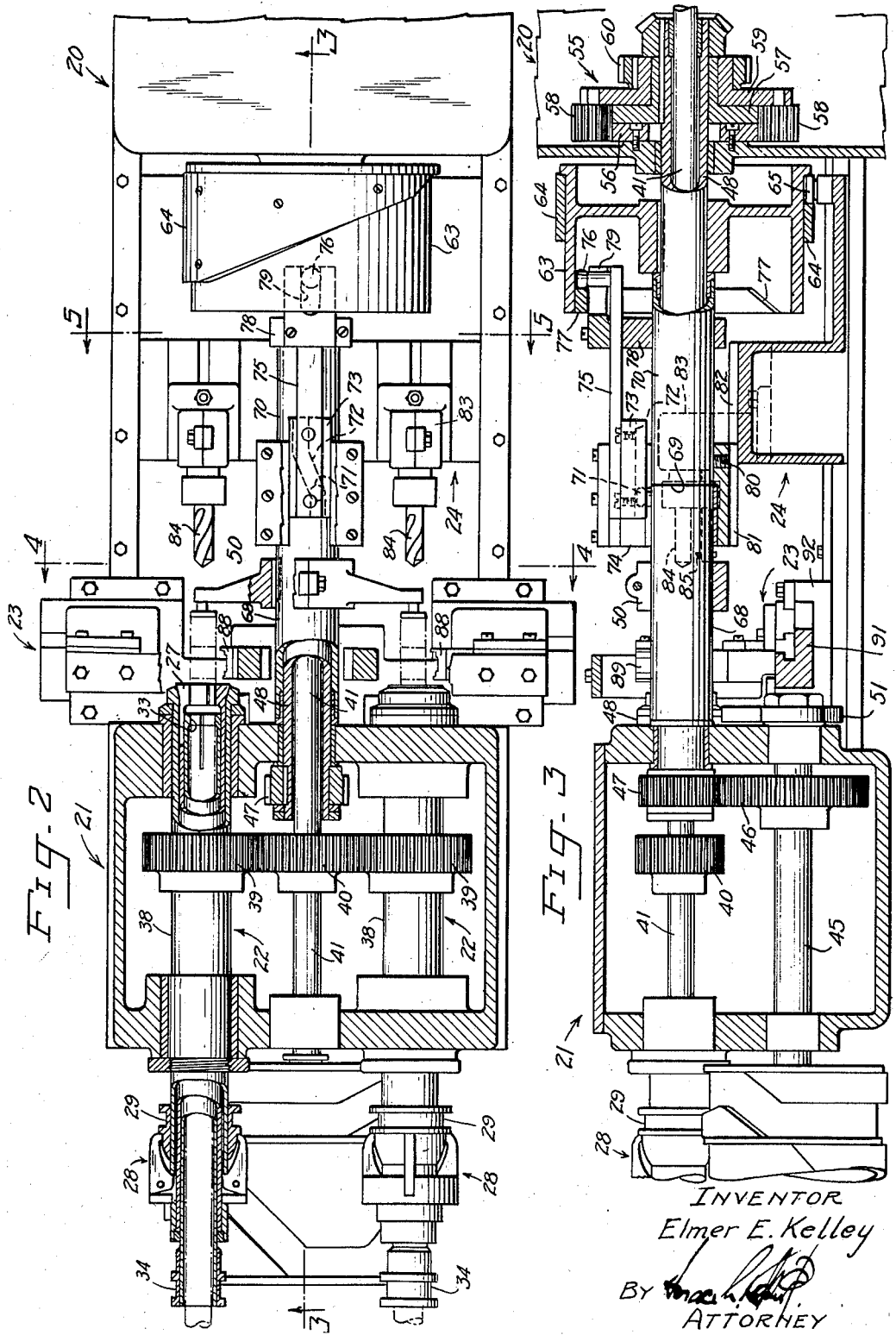
Fig. 2 is a fragmentary plan view of the machine as shown in Figure 1, certain of the parts being shown in section to facilitate illustration.
Fig. 3 is a longitudinal central section through the machine, taken on line 3—3 of Figure 2, certain of the parts being shown in elevation.

As shown more clearly in Figure 2, the work rotating spindles 22 are of similar construction, and each includes means for gripping the work during the tool operation thereon, and means for feeding the work forwardly at the completion of the tool operation to advance a new length of stock into the tool region. The work gripping and feeding means of the spindles 22 is well known in the art, and, therefore, a brief description of same will suffice to acquaint those skilled in the art with the cooperation of these devices in the present invention. The gripping of the work is effected by a tubular collet 27, the tube portion of which extends throughout the spindle to cooperate with an operating mechanism 28 therefor, actuated by a slidable cone including a collar 29. As shown in Figure 1, an arm mounted on a cam follower 30 engages the collar 29, the follower 30 cooperating with cams on a cam drum 31 so that as the latter is rotated, the cone collar 29 is reciprocated to thereby actuate the mechanism 28 and thus cause the collet 27 to grip or release the work stock therein during the desired time intervals. The mentioned work feeding means includes a tube within the collet tube 27, the forward end of which includes spring fingers 33 which yieldably grip the work rod, the tube carrying these fingers extending beyond the collet tube and having at its free end a collar 34 engaged by an arm of a sliding member 35, the latter being actuated by a cam follower 36, cooperating with a second cam on the cam drum 31 so that as the latter is rotated the yieldable fingers 33 are reciprocated in timed relation with the operation of the collet 27 to thereby advance the work rod therein, all in a well known manner.

It will, of course, be noted that each work rotating spindle includes an outer tube 38 serving to rotate the work in cooperation with the collet 27. Each outer tube 38 has a gear 39 secured thereon and in mesh with a driving gear 40 carried on a central shaft 41 extending longitudinally of the machine and driven by the mechanism within the gear box 20 and functioning to rotate the work in each spindle 22 at a constant and uniform speed during operation of the machine.

In my improved machine, to attain the desired operation of the tools on the transverse tool slide 23, as well as the tools on the longitudinally moving tool carrier 24, it is desired that the work gripping and feeding means of each spindle be operated simultaneously. Accordingly, the cams on the cam drum 31 for actuating these means, illustrated more clearly in Figure 6, are arranged so that the collets 27 of each spindle are contracted and expanded simultaneously and likewise the yieldable fingers 23 of each spindle are reciprocated simultaneously, this mode of operation being effected by providing duplicate sets of cams 43, 44 for each spindle on the cam drum 31.

The cam drum 31 is carried on and driven by a shaft 45 journalled in the head stock 21, this shaft having a driven gear 46 in mesh with a drive gear 47 carried on a central drive tube or hollow shaft 48 surrounding the drive shaft 41, the tube 48 extending also longitudinally of the machine and into the gear box 20, and driven by the mechanism within the gear box.

It will be seen that the central shaft 41 and the central tube 48 function to drive all of the operating units of the machine, the shaft 41 driving the spindles 22, and the tube 48 driving the work feeding and gripping mechanisms through the cam drum 31, and also driving the transverse tool slide 23, the longitudinal tool slide 24, and a stock stop arm 50 which cooperates with the work feeding mechanism to determine the length of stock to be fed. The transverse tool slide 23, Figure 4, is actuated by a cam disc 51 carried on the shaft 45 and cooperating with a pair of rolls 52 on the tool slide to reciprocate the same. The central tube 48 may be driven by any suitable mechanism within the gear box 20, this mechanism being preferably similar to that shown and described in my aforesaid prior patent, a portion only of this mechanism being shown in Figure 3.

In a preferred construction, the central shaft 41 and the central tube 48 are driven from a common source, such as an electric motor, not shown, the latter driving the gear box mechanism by a pulley 54, Figure 1, the shaft of which is operatively connected to drive the central shaft 41 and the central tube 48. The shaft 41 is also rotated at high speed, and to effect the drive for the tube 48 at a relatively slow speed by the same means, a suitable reduction gearing is employed, preferably that illustrated in Figure 3, including a planetary gear system 55 similar to that shown in my prior patent. A stationary gear 56 of a certain number of teeth is fixed to the casing of the gear box 20 concentric with the tube 48, the latter having fixed thereon a second gear 57 of a different number of teeth than gear 56. Both gears 56, 57 have in mesh therewith a series of pinions 58 rotatably carried on a spider 59, the latter being journalled on the hub of gear 57 and having affixed thereto a driven sprocket 60 actuated from the main drive, or shaft of the pulley 54. As the spider 59 is rotated, the pinions 58 revolve in an orbit about the gears 56, 57 and, due to the differential number of teeth in these gears, a relatively slow rotation is imparted to gear 57, to drive tube 48.

As shown, tube 48 drives the longitudinally moving tool carrier 24, this drive being effected by a cam drum 63 fixed on the tube 48 and having cam pads 64 cooperating with a roll 65 on the base of the tool carrier 24.

The stock stop arm 50 serves to determine the length of stock advanced by the feed mechanism of the spindles by abutting the ends of each stock rod as the same is fed forwardly from the spindles. During the feeding of the stock rods, the ends of the arm 50 are in axial alignment with the spindles, and, to permit the tools on the longitudinal tool carrier 24 to be advanced to the work, the stock stop arm 50 is swung out of effective position to the position shown in Figure 5. Arm 50 is adjustably carried in fixed position on a tube 68 surrounding and rotatably mounted on the central tube 48. It is to be noted that tube 68 terminates intermediate the gear box 20 and head stock 21, at 69, there being a second tube 70 contiguous therewith and also carried on the central tube 48, the tube 70 serving as a support for certain elements hereinafter described. The swinging of the stock stop arm 50 between effective and ineffective positions is accomplished by a roll 71 mounted on the tube 68 and cooperating with a cam slot 72 of a slide block 73, the latter being slidable in a suitable supporting member 74 and reciprocable axially of the tube 68 by a connecting rod 75 affixed thereto, and the latter having a roll 76 cooperating with a cam 77 on the interior of the cam drum 63. The projecting portion of the connecting rod 75 is guided for sliding movement in a bracket 78 secured to the stationary tube 70, the bracket 78 including guide members 79 adjacent each side of the roll 76 to guide the same in its reciprocatory movement. Means are also provided to prevent rotation of member 74 about tube 68 and thereby hold tube 70 non-rotative to maintain the position of guide bracket 78, tube 70 being fixed in the member 74 as by a set screw 80. For this purpose a sliding key connection between the member 74 and the reciprocatory tool carrier 24 is provided in the form of a key 81 on member 74 riding in a corresponding slot 82 on the tool carrier, see Figs. 3 and 5.

The tools on the tool carrier 24 include a series of tool holders 83, one for each work spindle 22, each adjustably secured on the carrier and adapted to support suitable tools, such as a drill 84 and cutter 85, for presentation axially to the work rotated by each spindle. It will be observed that each tool holder 83 may be adapted to support one or more of various tools required to produce a certain article, it being noted that a similar tool or set of tools is provided for operation on each spindle of the machine. It is further noted that all of the tools moving axially toward the work are carried on a common carrier, namely, the tool carrier 24, and accordingly all of these tools are presented simultaneously to the work of each spindle.

The relation of the cam 64, by which the longitudinally moving tool carrier 24 is reciprocated, with the cam 77 for actuating the stock stop arm 50, is such that arm 50 has its ends in axial alignment with the spindles as the tool carrier 24 is in retracted position and, as the tool carrier 24 is advanced to present the tools 84, 85 to the work, the stock stop arm 50 is immediately swung to ineffective position with the ends thereof disposed out of the path of the tools 84, 85.

As shown more clearly in Fig. 4, the transverse tool slide 23 carries a pair of diametrically opposed tools 88, 89 for each spindle, these tools being suitably supported as by a plurality of tool posts 90 mounted on a lower member 91 of the tool slide, and slidably retained on the bed 25 of the machine as by guide ways 92. The tools 88, 89 are all adjustably carried on the respective tool posts 90 so that adjustment of the tools relative to the work may be made as required.

With regard to the general cooperation of the tools on the transverse slide 23, with the tools on the longitudinal carrier 24, it may be here noted that the tool carrier 24 is reciprocated once forward and back during each cycle of the machine, whereas the transverse tool slide 23 moves in only a single direction during each cycle of the machine, the reverse stroke of the transverse tool slide being had during the succeeding cycle of the machine; that is, the tools 88 accomplish their work during one cycle and the tools 89 accomplish their work during a succeeding cycle, the tools 88, 89 thus operating alternately on the work of one spindle. It is desirable that such tools as 88, 89, being usually forming or cutting-off tools, or a combination of both, be fed to the work at a relatively slow speed, which speed is had due to the two cycle mode of operation of the transverse tool slide 23.

The tools 88, 89 are substantially alike in form, each tool being adapted to accomplish a similar operation or group of operations. As shown more clearly in Fig. 8, the tools 88, 89 may take the form of combined forming and cutting-off tools, the portion 93 being provided for forming the periphery of the work, while the portion 94 accomplishes the cutting-off operation.

Referring now to Figs. 14 and 15, the operation of the various tools of the machine, to produce a tubular article finished on all surfaces, will now be described. The region in which the tools operate may be divided into two work stations designated by X and Y, it being noted that the stock stop arm 50 is arranged to abut the work rod at the outermost limit of the work station Y. Preliminary to starting the machine for work on a new length of stock, the stock rod is projected from each work rotating spindle a distance ample to occupy the work station X only, as shown in Fig. 14, the work station Y being left void momentarily. The distance from the stock stop arm 50 to the end of the work rod at station X may be gaged by a suitable spacer block used temporarily. The machine may be turned over by hand employing a suitable crank, not shown, so that as power is turned on, the collets 27 of each spindle grip the work. When power is applied to the machine, the tool 89, Figure 14, is advanced to the blank work rod and forms the rod as shown, rounding each corner by the portions 93 of the tool and also trimming the end of the stock by the cutting-off portion 94. The axially operating tools 84, 85 are, during the operation of tool 89, moved toward the work but do not actually operate thereon, in that the work stock has not as yet been advanced into station Y, with the exception that the drill 84 cuts a slight bore in the end of the stock. As the machine continues to function, the tools 89, 84 and 85 are retracted, the latter tools being fully retracted, but the tool 89 being backed halfway. It will, of course, be noted that during retraction of tool 89, the opposite tool 88 of the pair is being advanced.

At this stage of operation, the work gripping and feeding means of each spindle functions so that the work rod including the partly finished work piece shown in Fig. 14, is advanced from station X to station Y, as shown in Fig. 15, the end of the stock rod now abutting the stock stop arm 50. The collets 27 of the spindles now grip the work and tool 88 continues to advance from its intermediate advanced position and, coming into engagement with the work, forms the blank stock at station X. At the same time, the tools 84, 85 are advanced into station Y to completely finish the work by boring the work piece throughout and by taking a finishing cut from the periphery thereof. The operation of tools 84, 85 is so timed with reference to the operation of tool 88, that as tools 84, 85 are being retracted, the work piece in station Y is severed from the stock rod by the cutting-off portion 94 of tool 88. At this stage of operation, the work piece in station X is partially completed as shown in Figure 14 and the machine continues to function automatically throughout successive cycles so that at each cycle of operation, a completed article is produced, it being noted that the corresponding tools at each spindle of the machine are accomplishing identical operations simultaneously and thereby produce a finished article on each spindle during each complete cycle, or two articles per cycle on a two spindle machine. It will, of course, be noted that on such jobs as do not require a boring or other axially applied operation, the tools 84, 85 may be omitted, in which instance, the tools 88, 89 operate in the same manner as described.

Attention is now directed to Figs. 9 to 17, inclusive, for a description of the modified form of the machine, it being noted that this form is particularly adapted for the production of threaded articles, this form of machine employing an automatic threading die of the self-opening type by which the thread cutting chasers of the die, upon completion of the required length of the thread, are automatically opened or released from the work to permit the withdrawal of the entire die therefrom. Such a die may produce straight threads as required on screws or bolts, or a thread having a taper in one direction only as on the usual pipe fitting.

The embodiment of the modified form of the machine illustrated herein, while being adapted for the control of the aforementioned well-known self-opening die, is further adapted for the use of a special self-opening die, shown herein, and of the type made by the Jones and Lamson Co. No claim is made to this die, per se, in this application. This special die, while being equipped with the self-opening feature, also has an automatically operative chaser-adjusting device by which threads of double tapering form are produced, such as are required for pipe nipples, the device being mechanized so as to gradually expand the die chasers during one-half of the threading operation, producing a singly tapered thread, and to thereafter contract the chasers for the remaining half of the threading operation, to produce an oppositely tapering thread on the final half of the work piece.

In the modified form, the machine presents substantially the same arrangement as in the first form described, same comprising generally the gear box or main drive 20, the headstock 21 including the spindles 22, the transverse tool slide 23 and the longitudinal tool carrier 24, all operating in substantially the same relationship. In the latter form, however, the longitudinal tool carrier 24 and the supporting member 74 of the stock stop arm actuating mechanism are modified so as to be adapted for the control of the aforementioned threading die indicated by numeral 100. The threading die 100 is mounted on the tool holder 83 in place of the tools 84, 85 of the first form.

The self-opening feature of the die is effected by movement of an axially sliding collar 101 with which is engaged a yoke 102 slidably mounted on a threaded rod 103 supported by projecting arms of a cross head 104 carried on the supporting member 74. During threading, the die 100 is advanced to the work by movement of the tool carrier 24, which movement is ample to produce a maximum desired length of thread. The movement of collar 101 on the die to effect opening or closing of the die chasers is relatively short and, accordingly, the yoke 102 assumes a sliding idle movement on rod 103, the threads of which adjustably carry stops or nuts 105, 106 at each limit of movement to thereby adjust the extent of idle movement for the yoke in relation to the length of thread required.

The distance between stop 105 and the adjacent forward end of yoke 102 represents the length of thread to be formed, it being noted that as yoke 102 engages stop 105, a further movement of die 100 causes the collar 101 to be retracted on the die and thereby opens the die chasers. Thus, the dies 100 are automaticaly advanced to the work, by the means for actuating the tool carrier 24 and, as the desired length of thread is completed, the die is opened. The tool carrier then begins its rearward movement, and with it the die, the chasers of which remain open as the yoke 102 moves idly between the stops 105, 106. As the die approaches its rearmost position, the yoke 102 engages the stop 106 and the die chasers will thereby close preparatory to a succeeding threading operation. The operation of the die 100 thus far described is had in the well-known self-opening threading die to produce a non-tapering or straight thread, or by substituting special tapered chasers to produce a thread having a single taper.

Where a thread of a double taper, as for pipe close nipples, is required, the threading die may be provided with adjustment means for expanding and contracting the die chasers in a manner to produce the double tapering thread, in addition to the above described means required for opening the dies at the finish of the thread cutting operation and closing the dies when they have been moved axially to their retracted position. In the present embodiment, the die chasers are adjusted to produce the reversely tapering thread during the thread cutting operation by a rotative movement of a sleeve 108 forming part of the die, this sleeve having a roll 109 projecting radially therefrom, see Figs. 11 and 12, in a cam groove 110 of a block 111, see Fig. 13. This block is removably attached to a stationary part of the machine, preferably to the supporting member 74, and, being removable, may be replaced by blocks having other cam grooves 110 to effect different tapers for the threads to be produced. As shown in Fig. 13, the cam groove 110 has an upwardly and a downwardly sloping portion, these portions acting successively upon the roll 109 so that the die chasers are gradually expanded as the roll 109 rides up the cam groove 110 to cut one tapered thread, and the chasers are gradually contracted as the roll rides down the further portion of the cam groove to cut the reversely tapered thread.

While I have described in some detail the operation of the die 100 with particular reference to the control of the die chasers, as being self-opening by a reciprocatory movement of the collar 101, and for taper thread control by a rotative movement of the sleeve 108, it will be observed that the control of the die for either manipulation of the die chasers may be effected by any suitable movement of the particular control element relative to the die, and, therefore, the respective elements 101 and 108 may be regarded generally as die controlling elements. In this regard, it is also to be noted that my machine in its modified form, provides means for autuating either the sliding control collar 101 alone or both of these control elements 101 and 108, depending upon the nature of the threading operation to be performed. Where the operation required necessitates the use of a die having only the self-opening feature, a reciprocatory control element alone may be used, in either instance the appropriate actuating means for same being provided substantially as disclosed. Further, where the die required for a particular threading operation necessitates the use of both control elements, these elements may be actuated by the combined means herein set forth.

Referring to Figs. 16 and 17, it will be noted that the operation of the modified form of the machine is substantially similar to that of the first form, a threading operation being performed, however, by the longitudinally movable tool carrier 24. In the production of articles such as pipe nipples, the blank stock rod may be of tubular form, usually standard pipe, thereby obviating the need for a boring operation. In setting up the machine to start operation, the blank tube or pipe is projected from each of the spindles to occupy the first station only, wherein station X', this being done in a manner similar to that described for the first form. It will be noted that the transverse tool slide 23 carries tools similar to that of the first form, herein designated as tools 88', 89'. As power is applied to the machine, the tool 89' is advanced to the work to form same in the desired contour, herein chamfering each end of the blank, after which tool 89' is retracted to the intermediate position shown. During this operation the threading die 100 is advanced and retracted, the same idling through the work station Y' for the initial cycle of the machine only. At this time, the gripping and feeding means for each spindle functions to advance the stock tube so that the partly completed pipe nipple shown in Fig. 16 at station X' is now advanced to the station Y', a new blank being thereby disposed in station X', the stock stop arm 50 functioning in the manner similar to proved arrangement of the transversely operable retraction of tool 89', tool 88' is being advanced to the work and thus forms the new blank now in station X'. At the same time the die 100 is being advanced so as to complete the threading operation on the partly finished article in station Y'. The operation of the die 100 and the tools 88', 89' is so timed that as soon as the threading operation is completed the cutting-off portion 94' of the tool severs the finished pipe nipple from the tube stock. At the moment the finished pipe nipple is severed, the work in station X' is formed as shown in Fig. 16, whence the machine continues to function so as to advance the stock tube, to complete the article by threading the partly completed work piece continuing these operations during successive cycles of the machine. It is to be noted that also in the modified form, the respective tools, including the threading die, operate substantially simultaneously on the work of each spindle and, thus a completed article is produced on each spindle during each cycle of the machine.

It will be seen from the foregoing that my improved arrangement of the tranversely operable tools enables the machine to operate in an improved manner, in that the respective tools of each pair at a given spindle are advanced alternately to accomplish corresponding operations on successive work pieces. That is, the use of two tools, or a pair of tools, at a given spindle affords a mode of operation in which first one tool operates on a first work piece to complete same, and then a second tool comes into play on a second work piece while the first tool is being retracted; to thus produce two finished articles. In contrast with this mode of operation, machines of the type shown in my prior Patent #1,892,239 have the one tool of a given spindle, comparable with the said pair of tools, being reciprocated forth and back twice to produce the equivalent two work pieces. Thus, assuming that each machine is operating at substantially the same speed, and each is tooled up to produce a similar article, my improved machine is capable of a production twice that of the former mode of operation. My improved tool operation, using the pair of tools, also has the important advantage of permitting a relatively slow tool feed, as compared with the use of a single tool only which requires that the tool be advanced slowly for proper cutting and be retracted rapidly to minimize the time per operation. If the tool is retracted at the same slow speed at which it is advanced, a prolonged time for an operating cycle results. By the tool arrangement provided herein, adequate time is had for the advance and retraction of the tools at the same relatively slow speed, notwithstanding a high speed operation of the machine; which condition permits of advancing the tools at an adequately slow speed to assure a longer tool life and a high quality of workmanship. This tool arrangement has the further salient advantage of enabling the use of a common carrier for both tools of one spindle as well as for the pairs of tools of all spindles, to assure a more accurate and uniform tool feed and also effect appreciable economies in the initial cost of the machine.

The mode of operation of the various groups of tools of the machine, that is the transversely movable tools, as well as the longitudinally movable tools, enables the machine to produce a finished article for each cycle of operation, and as many such articles as there are work-rotating spindles on the machine. In that the longitudinally movable tools operate in a work station beyond that in which the transversely movable tools operate, the respective mentioned tools may operate substantially at the same time, to thus produce finished articles usually requiring a series of successive operations, in an appreciably shorter time.

Further, it will be seen that I have provided an improved mechanism for actuating the stock stop arm between effective and ineffective positions, this mechanism enabling the stop arm to be actuated in accurate timed relation with the longitudinally movable tool carrier, each of these elements being actuated by a common cam drum.

Thus, the stop arm may be swung from effective to ineffective position during the advancement of the axially operable tools, the coordination of operation of the two mentioned elements being such that they may move concomitantly or immediately succeed each other, to thereby appreciably minimize the total time for a complete cycle of operation.

It may be here noted that the first embodiment of my machine, by the addition of several elements as herein illustrated, may be readily adapted for the controlled operation of automatic threading dies therein, certain elements of the machine in its first embodiment being adapted to function in cooperation with other elements by which the various controls of the threading die may be positively and automatically effected.

It will also be seen that I have provided, in a machine of this character, improved means for actuating the control elements of automatic self-opening or taper threading dies, whereby accurate manipulation of the die chasers is assured. In the second embodiment, the machine is adapted for actuating either a swingable control element or an axially slidable control element of the automatic threading die, or may be equipped to operate both control elements in the instance where the die has both the self-opening feature and the chaser adjusting feature for producing tapered threads. The means by which the slidable control element of the die is actuated, is arranged so as to accommodate a greater axial movement of the die than is required to operate the control element, this difference being compensated for by an adjustable device affording a variable limited idle movement of the control element before same is actuated relative to the die, the adjustment feature permitting any variations in the lengths of thread required in practice.

While I have in this application specifically described two forms which my invention may assume in practice, it will be understood that the same is shown for purposes of illustration, and that my invention may be modified and embodied in various other forms without departing from its spirit or the scope of the appended claims.

What I claim as new and desire to secure by Letters Patent is:

1. In a machine of the class described, a work rotating spindle including means for gripping and feeding the work therein, a pair of like tools on opposed sides of said spindle, a single means operatively supporting said tools and movable in fixed transverse planes, and means for actuating said tool supporting means in said planes to alternately present a different tool of the pair to different successively fed work in said spindle following successive operations of said gripping and feeding means.

2. In a machine of the class described, a work rotating spindle including automatic means for gripping and feeding the work therein, a pair of like tools on opposed sides of said spindle, a single means operatively supporting said tools and movable in fixed transverse planes, and means for actuating said tool supporting means in said planes to alternately present a different tool of said pair to different successively fed work in said spindle in timed relation with said automatic gripping and feeding means.

3. In a machine of the class described, a plurality of work rotating spindles, each spindle including means for automatically gripping and feeding the work therein, a pair of like tools on opposed sides of each of said spindles, a single means operatively supporting said tools and movable in fixed transverse planes, and means for actuating said tool supporting means in said planes to alternately present a different tool of each pair simultaneously to different successively fed work of said spindles following successive operations of said gripping and feeding means.

4. In a machine of the class described, a plurality of work rotating spindles, each spindle including means for automatically gripping and feeding the work therein, a pair of like tools on opposed sides of each spindle, a tool slide slidable in fixed planes transversely to the axes of said spindles and having means for operatively supporting said tools, and means for actuating said tool slide in said planes to alternately present a different tool of each pair simultaneously to different successively fed work of said spindles following successive operations of said feeding and gripping means.

5. In a machine of the class described, a plurality of work rotating spindles, each spindle including means for automatically gripping and feeding the work therein, cam means for operating said work gripping and feeding means of each spindle simultaneously, a pair of like tools on opposed sides of each spindle, a tool slide slidable in fixed planes transversely to the axes of said spindles, and cam means for actuating said tool slide in said planes to alternately present a different tool of each pair simultaneously to different successively fed work of said spindles following successive operations of said gripping and feeding means.

6. A machine of the class described, a plurality of work rotating spindles, each spindle including means for automatically gripping and feeding the work therein, a shaft axially parallel with said spindles, a first cam on said shaft for operating said work gripping and feeding means, a pair of like tools on opposed sides of each spindle, a tool slide slidable in fixed planes transversely to the axes of said spindles and having means for operatively supporting said tools, and a second cam on said shaft for actuating said tool slide in said planes to alternately present a different tool of each pair simultaneously to different successively fed work of said spindles following successive operations of said gripping and feeding means.

7. In a machine of the class described, a pair of work spindles rotatable on parallel longitudinal axes, mechanism for forming simultaneously work rotated by both spindles and cutting off said work simultaneously in both spindles including a tool slide movable transversely of the axes of said spindles and carrying like tools adapted to engage the work in both spindles as said slide is moved in one direction and means disposed below said spindles and between the latter for reciprocating said slide, and a driving member extending longitudinally of the machine between said spindles and driving said forming and cutting off mechanism.

8. In a machine of the class described, a pair of work spindles rotatable on parallel longitudinal axes, a tool carrier movable longitudinally of the machine to simultaneously present like tools thereon axially of the work in said spindles, mechanism for forming simultaneously work rotated by both spindles and cutting off said work simultaneously in both spindles including a transverse tool slide carrying a like tool for each spindle and means disposed below said spindles and between the latter for reciprocating said slide to present both tools to the work in their respective spindles simultaneously, and driving means extending longitudinally of the machine and between the axes of said spindles for driving said tool carrier and forming and cutting off mechanism in synchronism.

9. In a machine of the class described, a plurality of work rotating spindles, each spindle including means for automatically gripping and feeding the work therein, a stop mechanism adapted to cooperate with said feeding means to limit feeding of the work in said spindles and swingable to ineffective position, and means for swinging said stop mechanism in either direction between effective and ineffective positions including cooperating elements one carried by said stop mechanism and the other movable along the axis thereof.

10. In a machine of the class described, a pair of work rotating spindles, each spindle including means for automatically gripping and feeding the work therein, work stop mechanism including an oscillatory sleeve journalled in a plane between said spindles having a swingable stop arm adapted to cooperate with said feeding means in each spindle, a roll on said sleeve, a reciprocatory cam slot cooperating with said roll, and means for actuating said cam slot to swing said stop arm between effective and ineffective positions in timed relation with said work gripping and feeding means.

11. In a machine of the class described, a pair of work rotating spindles, each spindle including means for automatically gripping and feeding the work therein, a shaft parallel with and between said spindles, a stop arm mounted for oscillatory movement about said shaft and having a roll movable about the latter, said stop arm being adapted to cooperate with said feeding means to limit feeding of the work, and a reciprocatory cam movable along said shaft and cooperating with said roll to oscillate said arm between effective and ineffective positions.

12. In a machine of the class described, a pair of work rotating spindles, each including means for automatically gripping and feeding the work therein, cam means for actuating said work gripping and feeding means, a shaft driving said cam means, a driving tube between said spindles and extending longitudinally of the machine, driving connections between said tube and said cam shaft, a stop arm adapted to cooperate with said feeding means to limit feeding of the work in said spindles, said arm being mounted to oscillate on said driving tube, and means actuated by said driving tube for oscillating said arm between effective and ineffective positions.

13. In a machine of the class described, a plurality of work rotating spindles, a tool slide movable transversely to the axes of said spindles, cam means for reciprocating said tool slide including a cam shaft, a drive shaft between said spindles and extending longitudinally of the machine, driving connections between said drive shaft and spindles, a driving tube surrounding said drive shaft, driving connections between said driving tube and cam shaft, a stop arm mounted to oscillate on said driving tube, and means driven from said driving tube for oscillating said stop arm between effective and ineffective positions.

14. In a machine of the class described, a pair of work rotating spindles, each spindle including means for automatically gripping and feeding the work therein, a swingable stop arm pivoted between said spindles and adapted to cooperate with said feeding means to limit feeding of the work, a tool carrier movable to present tools thereon axially to the work in said spindles, a cam and roll device operatively associated with said stop arm, and means operable independently of said carrier for reciprocating one member of said device to oscillate said stop arm with a positive action in harmony with the movement of said tool carrier.

15. In a machine of the class described, a plurality of work rotating spindles, each spindle including means for automatically gripping and feeding the work therein, a tool carrier movable to present tools thereon axially to the work in said spindles, a stop arm adapted to cooperate with said feeding means to limit the extent of feeding of the work and movable to ineffective position, cam means for actuating said tool carrier, and a second cam means for swinging said stop arm and operable independently of the operation of said tool carrier.

16. In a machine of the class described, a pair of work rotating means on parallel longitudinal axes, a tool slide movable transversely of both said means, means for reciprocating said slide disposed below said work rotating means and between the latter, a driving member extending longitudinally of the machine between said work rotating means and driving said slide reciprocating means, a tool carrier movable longitudinally of the machine to present a tool thereon axially of said work rotating means, and means for actuating said tool carrier longitudinally including an actuating member mounted on said driving member.

17. In a machine of the class described, a longitudinally extended bed, a headstock at one end of said bed having a hollow spindle, a gear box at the other end of said bed having driving elements, means for automatically feeding stock through said spindle and gripping the same, drive means extending from said gear box longitudinally of said bed and having driving elements separately connected to said work feeding means and to said spindle, a tool carrier movable along said bed to and from the work gripped in said spindle, and means including an actuating member on one of said drive elements for effecting the aforesaid movements of said tool carrier.

18. In a drive for a machine of the class described, a longitudinally extended bed, a headstock at one end of said bed having a hollow spindle through which work stock is adapted to be fed, a gear box at the other end of said bed having coaxial driving elements rotatable at high and low speeds respectively, drive means extending from said gear box longitudinally of said bed and having coaxial high and low speed driving members separately connected to said driving elements, a tool carriage movable longitudinally of said bed to present a tool to the work in said spindle, and cam means including an actuating element on said low speed driving member for actuating said tool carriage longitudinally of said bed.

19. In a machine of the class described, a plurality of work rotating spindles, a drive shaft operatively connected to said spindle and extending longitudinally of the machine, a tool slide movable transversely of said spindles, a shaft including a cam for reciprocating said tool slide, a driving tube surrounding said spindle drive shaft and extending longitudinally of the machine, driving connections between said cam shaft and tube, a tool carrier movable longitudinally of the machine to present tools thereon axially of said spindles, and a cam mounted on said driving tube and adapted to actuate said tool carrier.

20. In a machine of the class described, a pair of work rotating spindles, each spindle including means for automatically gripping and feeding the work therein, a drive shaft between said spindles extending longitudinally of the machine, a rotatable tube about said shaft and having a roll, a stop arm carried on said rotatable tube and adapted to cooperate with said work feeding means to limit the extent of feeding and swingable to ineffective position, a stationary member about said shaft, reciprocatory cam means slidable in said stationary member and cooperating with said roll to swing said stop arm between effective and ineffective positions, and means for actuating said cam means.

21. In a machine of the class described, a pair of work rotating spindles, each spindle including means for automatically gripping and feeding the work therein, a drive shaft between said spindles and extending longitudinally of the machine, a rotatable tube about said shaft and having a roll, a stationary tube beyond said rotatable tube and carried on said shaft, a stop arm carried on said rotatable tube and adapted to cooperate with said work feeding means to limit the extent of feeding and swingable to ineffective position, a support member fixed to said stationary tube, reciprocatory cam means slidable in said support member and cooperating with said roll to swing said stop arm between effective and ineffective positions, and means for actuating said cam means.

22. In a machine of the class described, a pair of work rotating spindles, each spindle including means for automatically gripping and feeding the work therein, a drive shaft between said spindles and extending longitudinally of the machine, a rotatable tube about said shaft and having a roll, a stationary tube beyond said rotatable tube and carried on said shaft, a stop arm carried on said rotatable tube and adapted to cooperate with said work feeding means to limit the extent of feeding and swingable to ineffective position, a support member fixed to said stationary tube, reciprocatory cam means slidable in said support member and cooperating with said roll to swing said stop arm between effective and ineffective positions, means for actuating said cam means, and a tool carrier slidable longitudinally of the machine, having a sliding key connection between said support member and said tool carrier.

23. In a machine of the class described, a pair of work rotating spindles, each spindle including means for automatically gripping and feeding the work therein, a drive shaft between said spindles and extending longitudinally of the machine, a rotatable tube about said shaft and having a roll, a stationary tube beyond said rotatable tube and carried on said shaft, a stop arm carried on said rotatable tube and adapted to cooperate with said work feeding means to limit the extent of feeding and swingable to ineffective position, a support member fixed to said stationary tube, reciprocatory cam means slidable in said support member and cooperating with said roll to swing said stop arm between effective and ineffective positions, means for actuating said cam means including a connecting rod associated with said cam means, and a bracket carried on said stationary tube for guiding said rod.

24. In a machine of the class described, a pair of work rotating spindles, each spindle including means for automatically gripping and feeding the work therein, a drive shaft between said spindles and extending longitudinally of the machine, a rotatable tube about said shaft and having a roll, a stop arm carried on said rotatable tube and adapted to cooperate with said work feeding means to limit the extent of feeding and swingable to ineffective position, reciprocatory cam means cooperating with said roll to swing said stop arm between effective and ineffective positions, and means for actuating said cam means movable along the axis of said swinging stop member.

25. In a machine of the class described, a pair of work rotating spindles, each spindle including means for automatically gripping and feeding the work therein, a drive shaft between said spindles and extending longitudinally of the machine, a rotatable tube about said shaft and having a roll, a stop arm carried on said rotatable tube and adapted to cooperate with said work feeding means to limit the extent of feeding and swingable to ineffective position, reciprocatory cam means cooperating with said roll to swing said stop arm between effective and ineffective positions, means for actuating said cam means, a tool carrier slidable longitudinally of the machine, and a cam drum including cams for actuating said tool carrier and said arm actuating cam.

26. In a machine of the class described, a pair of work rotating spindles, each spindle including means for automatically gripping and feeding the work therein, a stop arm adapted to cooperate with the work feeding means of each spindle to limit the extent of feeding and swingable to ineffective position, an actuator for said stop arm, a tool carrier movable longitudinally of the machine to present tools thereon axially to the work on said spindles, and means for actuating said tool carrier and said stop arm actuator.

27. In a machine of the class described, a pair of work rotating spindles, each spindle including means for automatically gripping and feeding the work therein, a stop arm adapted to cooperate with the work feeding means of each spindle to limit the extent of feeding and swingable to ineffective position, a stationary member carried on the machine, an actuator for said stop arm, a tool carrier movable longitudinally of the machine to present tools thereon axially to the work on said spindles, means for actuating said tool carrier and said stop arm actuator, and an automatic threading die mounted on said tool carrier and having control elements for manipulating the die chasers thereof, said stationary member being disposed within the range of travel of said tool carrier and having means cooperating with the die chaser control elements for actuating same incident to movement of said tool carrier.

28. In a machine of the class described, the combination with a work rotating spindle, of a threading die having a control element thereon reciprocable therewith and adapted to determine the position of the chasers in said die, means mounting said die for reciprocatory movement relative to said work spindle, means for actuating said die mounting means to reciprocate said die and said control element thereon, and a member carried on the machine and engaging said reciprocatory element for effecting relative movement between said control element and said die.

29. In a machine of the class described, the combination with a work rotating spindle, of a threading die having a control element thereon reciprocable therewith and adapted to determine the position of the chasers in said die, means mounting said die for reciprocatory movement relative to said work spindle, means for actuating said die mounting means to reciprocate said die and said control element thereon, and a member engaging said reciprocatory element slidably carried on the machine for limited idle movement and adapted, upon reaching the limits of idle movement, to hold said control element and effect relative movement between the latter and said die during further movement of said die.

30. In a machine of the class described, the combination with a work rotating spindle, of a threading die having a control element thereon reciprocable therewith and adapted to determine the position of the chasers in said die, means mounting said die for reciprocatory movement relative to said work spindle, means for actuating said die mounting means to reciprocate said die and said control element thereon, a member engaging said reciprocatory element slidably carried on the machine for limited idle movement and adapted, upon reaching the limits of idle movement, to hold said control element to effect movement of said die relative to said element during further movement of said die, and means for varying the limits of idle movement of said member.

31. In a machine of the class described, the combination with a work rotating spindle, of a threading die having a control element thereon reciprocable therewith and adapted to determine the position of the chasers in said die, means mounting said die for reciprocatory movement relative to said work spindle, means for actuating said die mounting means to reciprocate said die and said control element thereon, a slide rod fixed on the machine, a member engaging said reciprocable element and slidable on said rod, and stops on said rod cooperating with said member to hold said reciprocable control element during further movement of said die, said stops being adjustable to vary the limits of sliding movement of said member on said rod.

32. In a machine of the class described, the combination with a work rotating spindle, of a threading die having a control element rotatable thereon adapted to open or close the chasers of said die, means mounting said die for reciprocatory movement relative to said work spindle, means for actuating said die mounting means, means responsive to reciprocatory movement of said die for rotating said control element, and cut off means operable after operation of said threading die and acting between the latter and said spindles.

33. In a machine of the class described, the combination with a work rotating spindle, of a threading die having a control element rotatable thereon adapted to open or close the chasers of said die, means mounting said die for reciprocatory movement relative to said work spindle, means for actuating said die mounting means, effective upon reciprocatory movement of said die to rotate said control element, and a transversely movable tool slide having a cut off tool thereon acting on the work in said spindle between the latter and said threading die.

34. In a machine of the class described, the combination with a work rotating spindle, of a threading die having a control element rotatable thereon adapted to open or close the chasers of said die, said control element including a roll, means mounting said die for reciprocatory movement relative to said work spindle, means for actuating said die mounting means, and a stationary cam cooperating with said roll and effective upon reciprocatory movement of said die to rotate said control element, said cam having oppositely inclined portions positively forwardly and reversely rotating said control element.

35. In a machine of the class described, the combination with a work rotating spindle, of a longitudinally reciprocable threading die including means responsive to movement of a first control element on said die relative to said die for opening or closing the chasers thereof, means responsive to movement of a second control element for gradually expanding or contracting the closed die chasers, means mounting said die for reciprocatory movement relative to said work spindle, means for actuating said die mounting means, and means responsive to movement of said die for actuating said first and second control elements.

36. In a machine of the class described, the combination with a work rotating spindle, of a threading die including a control element slidable on said die for opening or closing the chasers thereof, means mounting said die for reciprocatory movement relative to said work spindle, a member slidably carried on the machine for limited movement with said die, engaging said slidable control element and adapted upon reaching the limits of movement to hold said slidable control element and effect relative movement between said die and element incident to reciprocatory movement of said die, said die also including a rotatable control element for gradually expanding and contracting said closed chasers having a follower, and a stationary cam on the machine cooperating with said follower to rotate said last named control element incident to the reciprocatory movement of said die.

37. In a machine of the class described, in combination, a work rotating spindle including means for automatically gripping and feeding the work therein, a tool carrier movable endwise relative to said work spindle, a threading die on said tool carrier including a control element movable thereon for manipulating the chasers of said die, means responsive to movement of said die for actuating said control element, and means for actuating said tool carrier to reciprocate said die and actuate said control element in harmony with the operation of said work gripping and feeding means.

38. In a machine of the class described, a work rotating spindle including means for automatically gripping and feeding the work therein, a stop arm adapted to cooperate with said feeding means to limit the extent of feeding and swingable to ineffective position, a stationary member, means for swinging said stop arm, a tool carrier movable axially of said spindles, a threading die carried on said tool carrier and having a control element for manipulating the chasers of said die, and an actuating element carried on said stationary member and engaging said control element for actuating same incident to movement of said die.

39. In a machine of the class described, a work rotating spindle including means for automatically gripping and feeding the work therein, a stop arm adapted to cooperate with said feeding means to limit the extent of feeding and swingable to ineffective position, a stationary member, means for swinging said stop arm, a tool carrier movable axially of said spindles, a threading die carried on said tool carrier, said die including a slidable control element, and a yoke carried on said stationary member and engaging said control element for actuating same incident to movement of said die.

40. In a machine of the class described, a work rotating spindle including means for automatically gripping and feeding the work therein, a stop arm adapted to cooperate with said feeding means to limit the extent of feeding and swingable to ineffective position, a stationary member, means for swinging said stop arm, a tool carrier movable axially of said spindles, a threading die carried on said tool carrier, said die including a rotatable control element adapted to manipulate the chasers of said die and having a roll thereon, and a cam carried on said stationary member and cooperating with said roll to rotate said control element incident to movement of said die.

41. In a machine of the class described, a pair of work rotating spindles, each spindle including means for automatically gripping and feeding the work therein, a drive shaft between said spindles extending longitudinally of the machine, a rotatable tube about said shaft, a stop arm carried on said rotatable tube and positioned normally to cooperate with said work feeding means to limit the extent of feeding and swingable to ineffective position, a stationary member about said shaft, reciprocatory means for swinging said stop arm between effective and ineffective positions, a tool carrier movable axially of said spindles, a pair of threading dies carried on said tool carrier, each of said dies including a movable control element for manipulating the chasers thereof, and means carried on said stationary member for actuating the die chaser control elements incident to movement of said dies.

42. In a machine of the class described, a pair of work rotating spindles, each spindle including means for automatically gripping and feeding the work therein, a drive shaft between said spindles extending longitudinally of the machine, a rotatable tube about said shaft, a stop arm carried on said rotatable tube and positioned normally to cooperate with said work feeding means to limit the extent of feeding and swingable to ineffective position, a stationary member about said shaft, reciprocatory means for swinging said stop arm between effective and ineffective positions, a tool carrier movable axially of said spindles, a pair of threading dies carried on said tool carrier, each of said dies including a slidable member adapted to manipulate the chasers thereof, means for actuating said slidable member relative to its die and incident to movement of said dies and including a cross head carried on said stationary member, a slide rod for each die carried on said cross head, and a yoke slidable on each of said rods and operatively engaging said slidable member.

ELMER E. KELLEY.

CERTIFICATE OF CORRECTION.

Patent No. 2,201,182.

May 21, 1940.

ELMER E. KELLEY.

It is hereby certified that error appears in the printed specification of the above numbered patent requiring correction as follows: Page 5, first column, line 41, for the word "wherein" read --herein--; line 61, strike out "proved arrangement of the transversely operable" and insert instead --that previously described. During the further--; line 64, after "time" insert a comma; and second column, line 1, after "piece" insert a comma; page 7, second column, line 70, claim 19, for "spindle" read --spindles--; and that the said Letters Patent should be read with this correction therein that the same may conform to the record of the case in the Patent Office.

Signed and sealed this 27th day of August, A. D. 1940.

Henry Van Arsdale,
Acting Commissioner of Patents.

(Seal)